(12) United States Patent
Williams et al.

(10) Patent No.: US 7,532,440 B2
(45) Date of Patent: May 12, 2009

(54) DUAL STAGE, HEAD STACK ASSEMBLY FOR A DISK DRIVE

(75) Inventors: Stephen P Williams, Morgan Hill, CA (US); Albert Hartman, Palo Alto, CA (US); Thomas Tacklind, San Martin, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1438 days.

(21) Appl. No.: 09/768,975

(22) Filed: Jan. 23, 2001

(65) Prior Publication Data

US 2002/0097528 A1    Jul. 25, 2002

(51) Int. Cl.
*G11B 21/10* (2006.01)
(52) U.S. Cl. .................................... 360/294.3
(58) Field of Classification Search ............. 360/294.3, 360/294.4, 245.9, 245.8, 244.9, 245.4, 294; 29/603.03
See application file for complete search history.

(56) References Cited

U.S. PATENT DOCUMENTS

| | | | |
|---|---|---|---|
| 4,520,570 A | 6/1985 | Bednorz et al. | |
| 4,858,040 A | 8/1989 | Hazebrouck | |
| 5,079,652 A | 1/1992 | Ishida et al. | |
| 5,761,007 A | 6/1998 | Price et al. | |
| 5,867,347 A | 2/1999 | Knight et al. | |
| 5,898,544 A | 4/1999 | Krinke et al. | |
| 5,936,805 A | 8/1999 | Imaino | |
| 5,959,808 A | 9/1999 | Fan et al. | |
| 6,005,742 A | 12/1999 | Cunningham et al. | |
| 6,005,743 A | 12/1999 | Price et al. | |
| 6,016,692 A | 1/2000 | Schaenzer et al. | |
| 6,034,843 A | 3/2000 | Tsujino et al. | |

(Continued)

FOREIGN PATENT DOCUMENTS

WO    PCT/JP92/00939    7/1992

OTHER PUBLICATIONS

American Heritage Dictionary of the English Language, (4th ed. 2000), http://www.bartleby.com/61/27/S0852700.html. Last visited Nov. 6, 2008.*

(Continued)

*Primary Examiner*—Mark Blouin
(74) *Attorney, Agent, or Firm*—McCarthy Law Group

(57) ABSTRACT

A dual stage, head stack assembly (15) for a disk drive (10) having a storage disk (32) is provided herein. The head stack assembly (15) includes an actuator arm (18), a coarse positioner (22), a transducer assembly (20), a base plate (26) and a fine positioner (24). The coarse positioner (22) moves the actuator arm (18). The transducer assembly (20) includes a load beam (50), a flexure (52) and a data transducer (54). The base plate (26) includes at least one positioner cavity (66) which receives the fine positioner (24). A control system (17) directs current to the coarse positioner (22) to move the actuator arm (18) to position the data transducer (54) at or near a target track (36) on a storage disk (32). The control system (17) also directs current to the fine positioner (24) to precisely position and maintain the data transducer on the target track (36). Because the fine positioner (24) independently moves only the transducer assembly (20), a higher system bandwidth is achieved.

59 Claims, 4 Drawing Sheets

U.S. PATENT DOCUMENTS

| | | | |
|---|---|---|---|
| 6,043,957 A | 3/2000 | Hattori et al. | |
| 6,069,771 A | 5/2000 | Boutaghou et al. | |
| 6,134,087 A * | 10/2000 | Khan et al. | 360/294.6 |
| 6,188,548 B1 * | 2/2001 | Khan et al. | 360/294.4 |
| 6,362,933 B1 | 3/2002 | Sampietro et al. | |
| 6,396,667 B1 * | 5/2002 | Zhang et al. | 360/294.3 |
| 6,487,055 B1 * | 11/2002 | Mei | 360/294.4 |
| 6,501,625 B1 | 12/2002 | Boismier et al. | |
| 6,594,116 B1 * | 7/2003 | Ohwe et al. | 360/245.1 |
| 6,614,627 B1 * | 9/2003 | Shimizu et al. | 360/294.4 |

OTHER PUBLICATIONS

C.E. Yeack-Scranton, V.D. Khanna, K.F. Etzold, A.P. Praino, An Active Slider for Practical Contact Recording, IEEE Transactions on Magnetics, vol. 26, No. 5, Sep. 1990.

* cited by examiner

DUAL STAGE, HEAD STACK ASSEMBLY FOR A DISK DRIVE

FIELD OF THE INVENTION

The present invention relates generally to disk drives for storing data. More specifically, the present invention relates to a head stack assembly that includes a coarse positioner and a fine positioner.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular, regions of different radii, commonly referred to as "tracks". Typically, a head stack assembly including a positioner and an E-block are used to position a data transducer of a transducer assembly proximate each data storage surface of each storage disk. With these systems, the accurate and stable positioning of the data transducer is critical to the accurate transfer and/or retrieval of information from the rotating storage disks.

The data transducer transfers information to and from the storage disk. The transducer assembly also includes a load beam and a suspension for supporting the data transducer near the storage surface. The load beam is somewhat similar to a cantilevering spring element and applies a downward force on the data transducer.

The need for increased storage capacity has led to the use of disks having increased track density and decreased track pitch, i.e., more tracks per inch. As the tracks per inch increase, the ability to maintain the data transducer on a particular target track becomes more difficult.

The inaccurate positioning of the data transducer relative to the tracks on the rotating disks is commonly referred to as "track mis-registration." Track mis-registration leads to errors or delays in the transfer of data. Mechanical phenomena that contribute to track mis-registration include: (i) non-repeatable spindle runout, i.e. bearing defects, ball cage, etc.; (ii) repeatable spindle runout, i.e. imbalance caused by disk shift, etc.; (iii) disk vibration modes; (iv) structure vibration modes, i.e. rotor, coil, bearings, base, etc.; (v) rotor bearing non-linear friction; (vi) windage disturbance (vibrations) of the head stack assembly; and (vii) externally applied shock and vibration.

Keeping the data transducer positioned on the target track with all of these disturbances, while at the same time increasing the tracks per inch, requires that the servo band-width of the positioner be increased. Over the past several years the structures of the disk drive have become smaller and have higher resonance characteristics. Thus, increasing the servo band-width of the positioner has proven to be increasingly difficult.

One attempt to increase servo band-width and minimize track mis-registration includes securing two piezoelectric motors to the load beam. More specifically, in this design, a hinge section is added to the load beam. The hinge section allows the load beam to flex in the tracking direction. The two piezoelectric motors are attached across the hinge section. When the piezo electric motors are energized, the load beam, and thus the data transducer, can be moved back and forth in the tracking direction.

However, material must be removed from the load beam to create the hinge section. This reduces the strength of the load beam. Further, the piezoelectric motors, which are attached across the hinge section, become a significant portion of the load beam structure and provide a substantial portion of the strength of the load beam.

Unfortunately, shock loads and vibration to the disk drive can cause significant bending of the load beam. Further, the load beam is subjected to repeated and significant bending in a ramp load/unload type disk drive. In this design, the piezoelectric motors attached to the load beam are placed in a shear mode when a significant bending force is applied to the load beam. Typically, the piezoelectric motors are made from a ceramic material which is very brittle and subject to stress cracking when subjected to bending actions. Thus, shock loads and vibration to the disk drive can cause the piezoelectric motors to function improperly and/or fail.

Additionally, because the piezoelectric motors are placed in a portion of the load beam that is very sensitive to the function and dynamics of the load beam, small changes in load beam stiffness may result in head gram load loss. Further, the motors influence the geometry, mass and center of gravity of the head stack assembly. This can adversely affect the resonance characteristics of the head stack assembly.

In light of the above, it is an object of the present invention to provide a head stack assembly having a higher servo-band width. Another object of the present invention is to add a fine positioner to a traditional head stack assembly with minimal changes to the design of the head stack assembly. Still another object of the present invention is to minimize track mis-registration. Yet another object of the present invention is to increase the reliability of the head stack assembly. Still another object is to provide a high-density disk drive.

SUMMARY

The present invention is directed to a head stack assembly for a disk drive and a method for retrieving data from a target track on a rotating storage disk of a disk drive. The head stack assembly includes an actuator arm, a coarse positioner, a transducer assembly, a base plate and a fine positioner. The coarse positioner moves the actuator arm and the transducer assembly relative to the storage disk. The transducer assembly includes a load beam, a flexure secured to the load beam, and a data transducer secured to the flexure. The base plate secures the transducer assembly to the actuator arm. The fine positioner increases the band-width of the head stack assembly and minimizes track mis-registration.

Uniquely, the fine positioner is secured directly to the base plate instead of the load beam. As a result of the design, the fine positioner experiences less severe bending than if the fine positioner is secured to the load beam. Further, the fine positioner can be added to the head stack assembly with minimal changes to the design of the head stack assembly. Moreover, the location of the find positioner minimizes the likelihood of adverse resonance characteristics of the head stack assembly and avoids head gram load loss.

Preferably, the fine positioner is positioned in a positioner cavity in the base plate. As a result thereof, the fine positioner is placed in a compression mode rather than a shear mode. In the compression mode, the fine positioner is more resilient to shock loads and vibration. This reduces the incidence of fine positioner stress cracking and increases the reliability of the fine positioner.

Preferably, the disk drive includes a control system for directing current to the coarse positioner and the fine positioner. In one embodiment, the control system directs current to the coarse positioner to move the data transducer to near the target track. Subsequently, the control system further directs current to the fine positioner to move the data transducer from near the target track to the target track. Alternatively, for example, the control system directs current to a coarse positioner to move the data transducer onto the target track. Subsequently, the control system directs current to the fine positioner to maintain the data transducer on the target track.

The present invention is also directed to a method for retrieving data from a target track on a rotating storage disk of a disk drive. The method includes the steps of providing a transducer assembly, providing an actuator arm, securing the transducer assembly to the actuator arm with a base plate, moving the actuator arm relative to the storage disk with a coarse positioner, securing a fine positioner to the base plate, and adjusting the position of the data transducer relative to the storage disk with the fine positioner.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
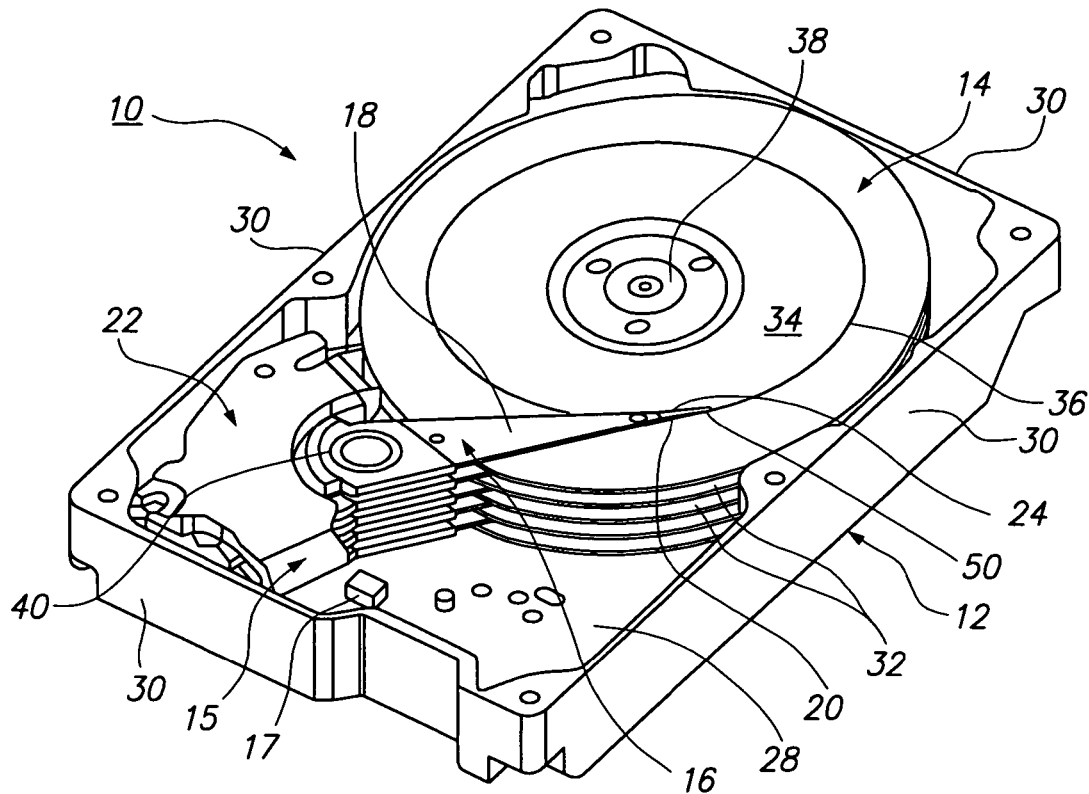
FIG. 1 is a perspective view of a disk drive having features of the present invention.

Referring initially to FIG. 1, a disk drive 10 according to the present invention includes (i) a drive housing 12, (ii) a disk assembly 14, (iii) a dual stage, head stack assembly 15, and (iv) a control system 17. As provided herein, the head stack assembly 15 includes (i) an E-block 16 having one or more actuator arms 18, (ii) one or more transducer assemblies 20, (iii) a coarse positioner 22, (iv) one or more fine positioners 24, and (v) one or more base plates 26. Each fine positioner 24 independently moves one transducer assembly 20 and increases the system band-width of the head stack assembly 15. This allows for more accurate data transfer to and from the disk assembly 14.

As an overview, the fine positioner 24 is directly secured to the base plate 26. Because of this unique mounting location, the influence of the fine positioner 24 on the performance characteristics of the head stack assembly 15 is minimized. Further, the resilience of the fine positioner 24 is enhanced.

A detailed description of the various components of a disk drive 10 is provided in U.S. Pat. No. 5,208,712, issued to Hatch et al. The contents of U.S. Pat. No. 5,208,712 are incorporated herein by reference.

The drive housing 12 retains the various components of the disk drive 10. The drive housing 12, illustrated in FIG. 1, includes a base 28 and four (4) side walls 30. A typical drive housing 12 also includes a cover (not shown) which is spaced apart from the base 28 by the side walls 30. The drive housing 12 is typically installed in the case of a computer (not shown) or a word processor (not shown).

The disk assembly 14 includes one or more storage disks 32 that store data in a form that can be subsequently retrieved if necessary. Magnetic storage disks 32 are commonly used to store data in digital form. For conservation of space, each storage disk 32 preferably includes a data storage surface 34 on each side of the storage disk 32. These storage surfaces 34 are typically divided into a plurality of narrow annular regions (not shown) of different radii, commonly referred to as "tracks." The storage disks 32 are manufactured by ways known to those skilled in the art.

FIG. 1 illustrates a target track 36 on the top data storage surface 34 of the top storage disk 32. The target track 36 contains the data desired to be retrieved. It should be understood that the target track 36 illustrated in FIG. 1 is for reference and that the target track 36 could be anyone of the tracks on anyone of the disks 32.

Depending upon the design of the disk drive 10, any number of storage disks 32 can be used with the disk drive 10. For example, the disk drive 10 can include one (1), two (2), three (3), six (6), nine (9), or twelve (12) storage disks 32. For two-sided storage disks 32, the disks 32 are spaced apart a sufficient distance so that at least one (1) transducer assembly 20 can be positioned proximate each of the storage surfaces 34 of adjacent storage disks 32. To conserve space, a centerline (not shown) of consecutive disks 32 is typically spaced apart between about one millimeter (1.0 mm) to three millimeters (3.0 mm).

The storage disks 32 are spaced apart on a disk spindle 38 which is mounted to a spindle shaft (not shown). The spindle shaft is typically secured to the base 28. The disk spindle 38 rotates on a disk axis (not shown) relative to the spindle shaft on a spindle bearing assembly (not shown). Typically, the disk spindle 38 and the storage disks 32 are rotated about the disk axis at a predetermined angular velocity by a spindle motor (not shown).

The E-block 16 retains and positions the transducer assemblies 20 proximate to the data storage surface 34. The design of the E-block 16 depends upon the design of the coarse positioner 22 and the design of the disk drive 10. In the embodiment illustrated in FIGS. 1 and 2, the E-block 16 includes an actuator hub 40 and a plurality of parallel actuator arms 18 which are attached to and cantilever from the actuator hub 40. In the embodiment illustrated in the Figures, the actuator hub 40 is substantially tubular and can be mounted to an actuator shaft 42 (illustrated in FIG. 1). The actuator hub 40 rotates about a hub axis relative to the actuator shaft 42 on an actuator bearing assembly (not shown).

The actuator arms 18 move with the actuator hub 40 and position the transducer assemblies 20 between the storage disks 32, proximate the data storage surfaces 34. Each actuator arm 18 includes a proximal section 44 which is secured to the actuator hub 40 and a distal section 46 which cantilevers away from the actuator hub 40. The spacing of the actuator arms 18 varies according to the spacing of the storage disks 32. The distance between consecutive actuator arms 18 is typically between about one millimeter (1 mm) to three millimeters (3 mm).

The distal section 46 of each actuator arm 18 can have a substantially rectangular cross-section and include an arm hole 48 to facilitate attaching the transducer assemblies 20 to the actuator arms 18. As can best be seen in FIGS. 1 and 2, a width of each actuator arm 18 can taper from the proximal section 44 to the distal section 46. The amount of taper can vary according to the design of the E-block 16 and the design of the disk drive 10.

The transducer assemblies 20 transfer or transmit information between the computer (not shown) or word processor (not shown) and the storage disks 32. Typically, each transducer assembly 20 includes a load beam 50, a flexure 52, and a data transducer 54. The load beam 50 attaches the flexure 52 and the data transducer 54 to the E-block 16. Preferably, each load beam 50 is flexible in a direction perpendicular to the storage disk 32 and acts as a spring for supporting the data transducer 54. Typically, each load beam 50 has a thickness of approximately 0.0508 millimeters and is made of 304 tension annealed, full hard stainless steel.

Each flexure 52 is used to attach one (1) of the data transducers 54 to one (1) of the load beams 50. Typically, each flexure 52 includes a plurality of conductive flexure traces that are electrically connected to the data transducer 54. Each flexure 52 is subsequently attached to a flex circuit that electrically connects the flexures 52 to the disk drive 10. Typically, each flexure has a thickness of approximately 0.025 millimeters.

Each data transducer 54 interacts with one (1) of the storage disks 32 to access or transfer information to the storage disk 32. For a magnetic storage disk 32, the data transducer 54 is commonly referred to as a read/write head. Each data transducer 54 is typically secured to a slider 55.

The coarse positioner 22 moves the E-block 16 about the hub axis. The coarse positioner 22 can be implemented in a number of alternate ways known by those skilled in the art. For example, the coarse positioner 22 can be a rotary voice coil actuator or a linear voice coil actuator. In the embodiment shown in FIG. 1, the coarse positioner 22 is a rotary voice coil actuator. In this embodiment, activation of the coarse positioner 22 rotates the E-block 16 and moves the transducer assemblies 20 relative to the storage disks 32.

Figure 2A:
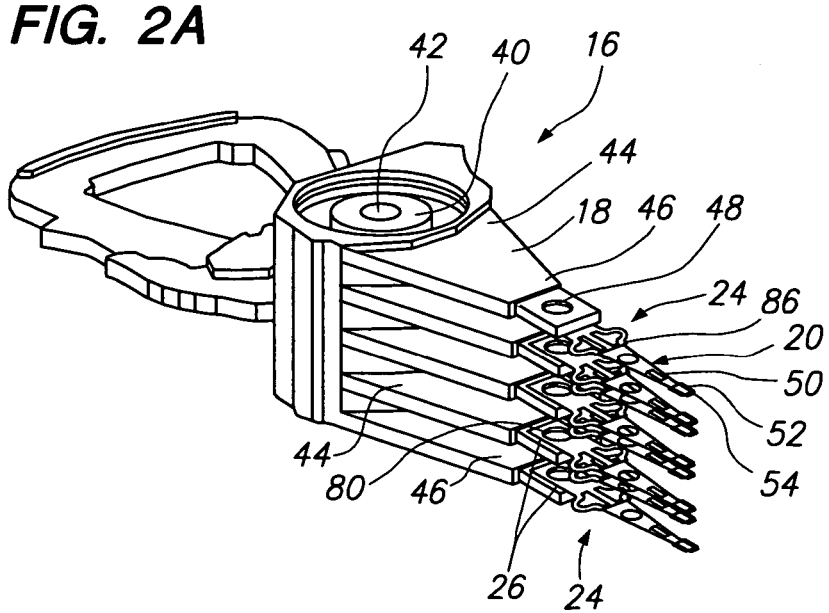
FIG. 2A is a perspective view of a head stack assembly having features of the present invention.
Figure 2B:
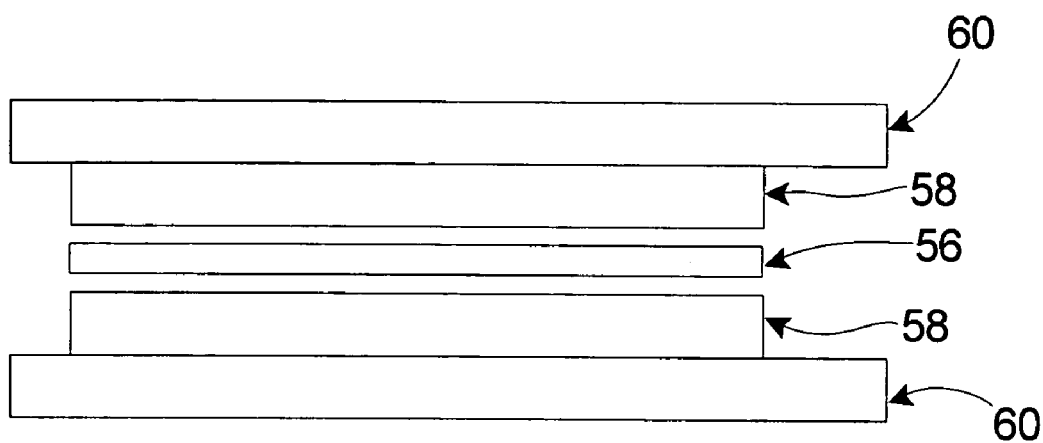
FIG. 2B is a rear view of a coarse positioner having features of the present invention.

Referring to FIGS. 2A and 2B, the coarse positioner 22 includes a coil 56, a pair of magnets 58, and a pair of flux return plates 60. The coil 56 is attached to the E-block 16. Further, the coil 56 is disposed between the pair of spaced apart permanent magnets 58 and the pair of spaced apart flux return plates 60. The magnets 58 are positioned between the flux return plates 60. Typically, the flux return plates 60 are secured to the drive housing 12 and the magnets 58 are secured to the flux return plates 60.

The magnets 58 have pole faces of opposite polarity directly facing opposite legs of the coil 56. The resultant magnetic fields are such that current passing through the coil 56 in one (1) direction causes rotation of the E-block 16 in one (1) radial direction relative to the disk assembly 14, while reverse current causes reverse direction movement. Thus, the coarse positioner 22 is able to bi-directionally rotate the E-block 16 relative to the drive housing 12.

Each base plate 26 secures one transducer assembly 20 to one of the actuator arms 18. The design of the base plate 26 can be varied. A couple of alternate embodiments of the base plate 26 are provided herein. In each embodiment, the fine positioner 24 is secured directly to the base plate 26. Positioning the fine positioner 24 on the base plate 26 instead of the load beam 50 provides greater stability of the fine positioner 24, and reduces the incidence of stress cracking or shock fracture to the fine positioner 24. Further, with this mounting location, the influence of the fine positioner 24 on the performance characteristics of the head stack assembly 15 is minimized.

In the embodiments illustrated herein, the base plate 26 somewhat rectangular shaped and includes a plate top 70, a plate bottom 72, a plate proximal end 74, a plate distal end 76, and a pair of opposed plate sides 78. Typically, the base plate 26 is made of 301 or 304 stainless steel.

The base plate 26 also includes a plate mount 80, a beam mount 82, a mover mount 84, and at least one (1) flex section 86. The plate mount 80 secures the base plate 26 to one of the actuator arms 18. The design of the plate mount 80 can be varied. In the embodiment illustrated in the Figures, the plate mount 80 is a tubular structure that extends above the plate top 70 near the plate proximal end 74. In this embodiment, the plate mount 80 fits into the arm hole 48 of the actuator arm 18. Subsequently, the plate mount 80 is radially expanded to swage the plate mount 80 to the actuator arm 18.

The beam mount 82 fixedly secures the load beam 50 to the base plate 26. The loam beam 82 can be secured to the base plate 26 in a number of alternate ways. For example, in the embodiment illustrated in the Figures, the load beam 50 is laser-welded to the plate bottom 72 of the base plate 26 near the plate distal end 76.

The mover mount 84 secures the fine positioner 24 to the base plate 26. The design of the mover mount 84 will vary according to the design of the fine positioner 24. In each embodiment illustrated herein, the mover mount 84 includes a pair of spaced apart, rectangular shaped, positioner cavities 85 that are sized and shaped to receive the fine positioner 24.

Preferably, the positioner cavities 85 are oriented parallel to the plate sides 78. This design allows the fine position 24 to move the plate distal end 76 and the transducer assembly 20 back and forth in the tracking direction along the storage disk.

Figure 3A:
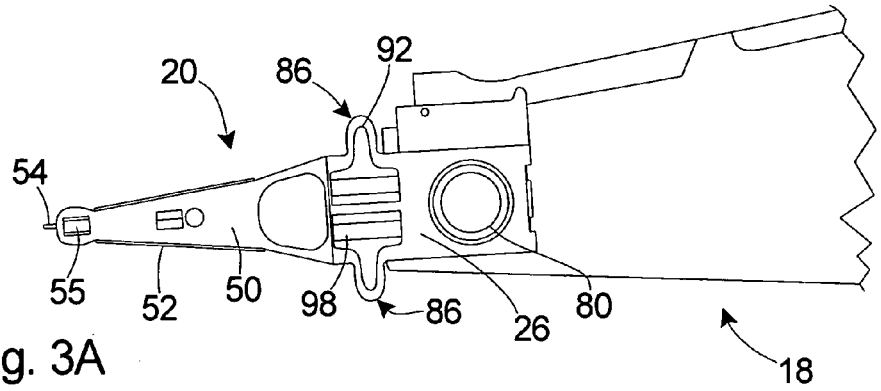
FIG. 3A is a top plan view of a portion of an E-block, a transducer assembly and a first embodiment of a base plate and a fine positioner having features of the present invention.
Figure 3B:
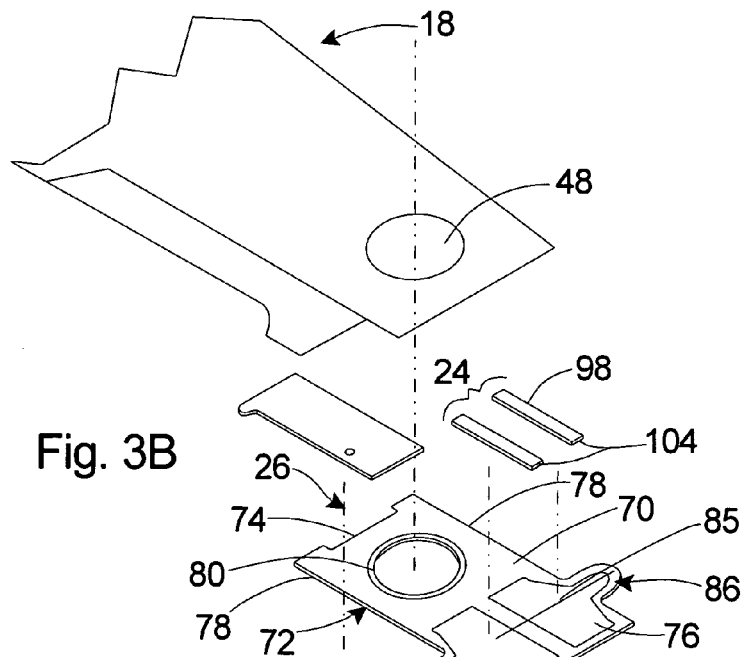
FIG. 3B is an exploded perspective view of FIG. 3A.
Figure 3C:
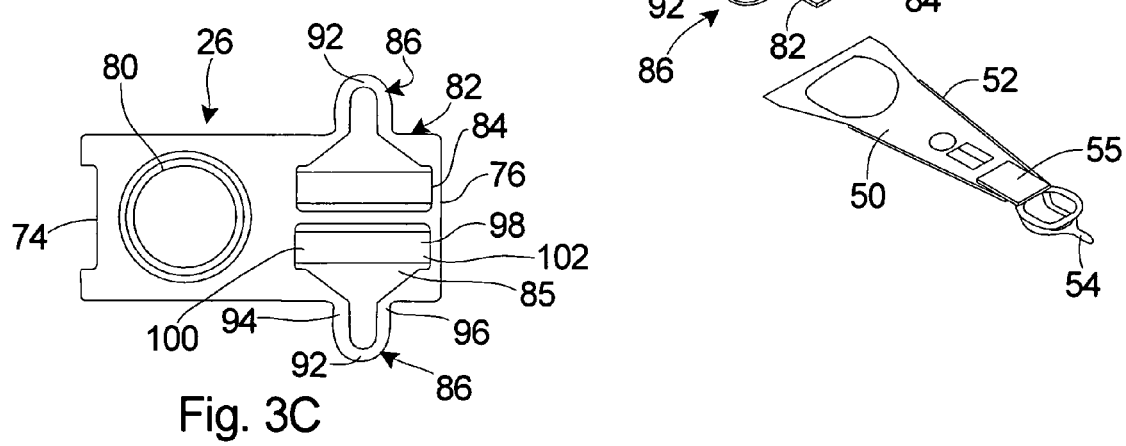
FIG. 3C is a top plan view of the base plate and the fine positioner of FIG. 3A.
Figure 4A:
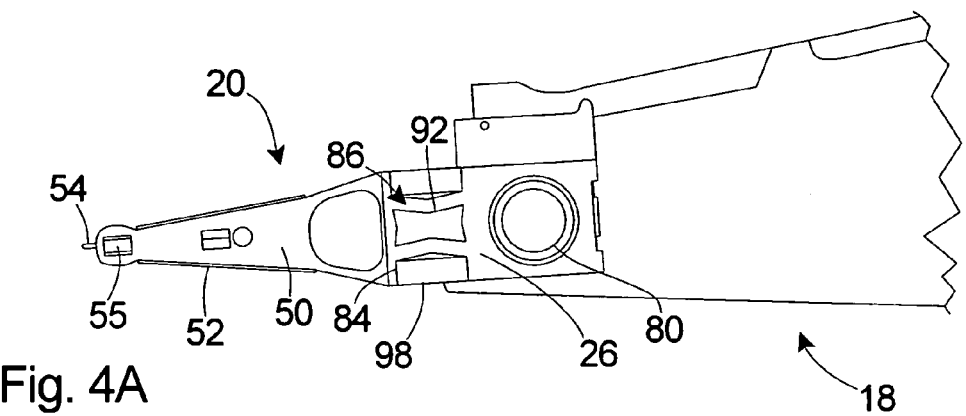
FIG. 4A is a top plan view of a portion of an E-block, a transducer assembly and a second embodiment of a base plate and a fine positioner having features of the present invention.
Figure 4B:
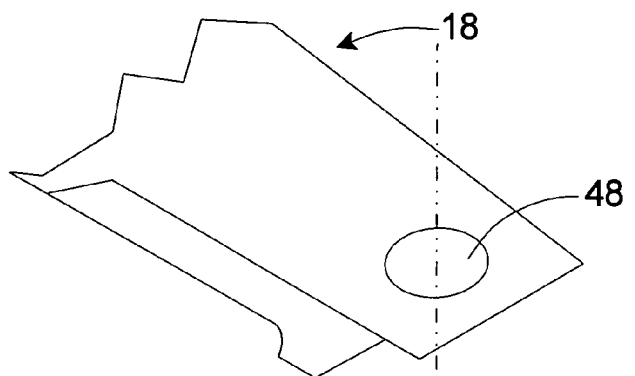
FIG. 4B is an exploded perspective view of FIG. 4A.
Figure 4C:
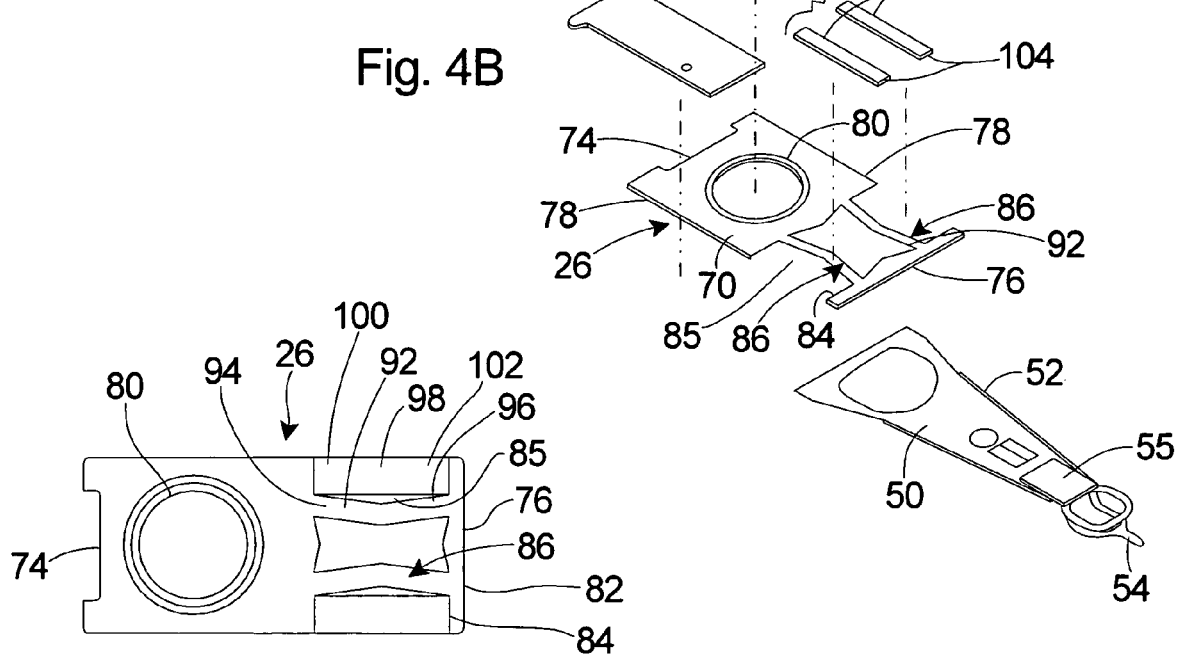
FIG. 4C is a top plan view of the base plate and the fine positioner of FIG. 4A.

The flex sections 86 allow the plate distal end 76 to move relative to the plate proximal end 74. Each flex section 86 includes at least one flex point 92. Each flex point 92 includes a first flex point end 94 and a second flex point end 96. The first flex point end 94 and the second flex point end 96 are, for example, oriented in a line substantially parallel to the plate sides 78. In one embodiment, the flex point 92 is generally a U-shaped structure as shown in FIGS. 3A-3C. Alternatively, as shown in FIGS. 4A-4C, the flex point 92 is generally V-shaped. Still alternately, the flex point 92 may be another configuration. In FIGS. 3A-3C, the flex points 92 extend outwardly from the plate side 78, and are exterior to the fine positioner 24 and the positioner cavities 85. In another embodiment shown in FIGS. 4A-4C, the flex points 92 are oriented interiorly from the fine positioners 24 and the positioner cavities 85.

Actuating the fine positioner 24 results in flexion or extension of at least one (1) flex point 92. Flexion or extension of the flex point 92 causes the plate distal end 76 to laterally rotate resulting in precisely controlled side-to-side movement of the attached transducer assembly 20. The side-to-side movement of the transducer assembly 20 ultimately translates into fine movement of the data transducer 54 relative to the data storage surface 34. This allows the fine positioner 24 to maintain the data transducer 54 on the target track 36 of the data storage surface 34 despite occurrences of mechanical phenomena that typically contribute to track mis-registration.

Notably, the thickness of the base plate 26 is typically between approximately 0.15 to 0.25 millimeters, with a preferable thickness of approximately 0.20 millimeters. In comparison as provided above, the thickness of the load beam 50 is approximately 0.0508 millimeters. This is roughly one-third to one-fifth the thickness of the base plate 26. Thus, the base plate 26 is relatively stiff when compared to the load beam 50 and the fine positioner 24 is protected somewhat from shock and vibration. This improves the life of the fine positioner 24.

The fine positioner 24 deflects the base plate 26 and moves the transducer assembly 20 relative to the storage disk 32 to finely adjust the position of the data transducer 54 relative to the storage disk 32. Further, the fine positioner 24 increases the band-width of the head stack assembly 15 and minimizes track mis-registration. The design of the fine positioner 24 can be varied to suit the movement requirements of the disk drive 10.

In the embodiments illustrated in FIGS. 3A-3C and 4A-4C, the fine positioner 24 includes a pair of rectangular shaped, spaced apart piezoelectric motors 98. Each motor 98 includes a proximal end 100 and a distal end 102. Preferably, each motor 98 is positioned in one of the positioner cavities 85 in the base plate 26. Preferably, the proximal end 100 and the distal end 102 are secured to the base plate 26 within the positioner cavity 66 with an adhesive 104. As a result thereof, the motors 98 are placed in a compression mode rather than a shear mode during operation of the fine positioner. This reduces the incidence of the motors 98 stress cracking and decreases the likelihood of loss of function of the fine positioner. Moreover, by securing the fine positioner 24 to the base plate, the likelihood of adversely affecting the resonance characteristics of the load beam is decreased.

Preferably, each motor 98 has a thickness of approximately 0.19 millimeters. With this design, the fine positioner 24 is housed in the positioner cavity 66 such that the top surface of the fine positioner 24 lies flush with the plate top 70.

The control system 17 directs current to the coarse positioner 22 and the fine positioner 24 to precisely position and maintain the data transducer 54 on the target track 36. More specifically, the control system 17 directs current to the coil 56 of the coarse positioner 22 to rotate the E-block 16 relative to the storage disk 32. Further, the control system 17 directs current to the piezoelectric motors 98 to expand the motors 98 to control the expansion of the motors 98.

In one embodiment, the control system 17 directs current to the coarse positioner 22 to move the data transducer 54 to near the target track 36. Subsequently, the control system 17 further directs current to the fine positioner 24 to move the data transducer 54 from near the target track 36 to the target track 36. Alternatively, for example, the control system 17 can direct current to a coarse positioner 22 to move the data transducer 54 onto the target track 36. Subsequently, the control system 17 directs current to the fine positioner 24 to maintain the data transducer 54 on the target track 36 during rotation of the storage disk.

While the particular head stack assembly 15 and disk drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A head stack assembly comprising:
   an actuator arm;
   a coarse positioner that moves the actuator arm relative to a storage media;
   a data transfer assembly including a load beam, a flexure secured to the load beam, and a data transfer member secured to the flexure;
   a base plate securing the data transfer assembly to the actuator arm, the base plate having a thickness that is about three times or more the thickness of the load beam, the base plate further including (i) one or more edges, (ii) a pair of flex sections that cantilever away from at least one of the edges, the flex sections allowing the base plate to flex, and (iii) a pair of spaced apart positioner cavities that are positioned between the flex sections; and
   a fine positioner secured to the base plate, the fine positioner being positioned in the positioner cavities, the fine positioner moving a portion of the base plate relative to the actuator arm.

2. A disk drive comprising the head stack assembly of claim 1, and a storage disk.

3. The disk drive of claim 2 further comprising a control system that (i) directs current to the coarse positioner to move the actuator arm so that the data transducer is positioned near a target track and (ii) directs current to the fine positioner to move the base plate so that the data transducer is positioned on the target track.

4. The disk drive of claim 2 further comprising a control system that (i) directs current to the coarse positioner to move the actuator arm so that the data transducer is on a target track, and (ii) directs current to the fine positioner to selectively move the base plate to maintain the data transducer on the target track.

5. The disk drive of claim 2 wherein the fine positioner is a piezoelectric motor.

6. The head stack assembly of claim 1 wherein the base plate is separately formed.

7. A data storage device, comprising:
   an actuator arm;
   a data transfer assembly including a load beam and a data transfer member coupled to the load beam;
   a base plate that secures the data transfer assembly to the actuator arm, the base plate including a pair of flex sections that allows the base plate to flex; and
   a fine positioner including a pair of piezoelectric motors positioned so that the pair of flex sections are between the pair of piezoelectric motors, the fine positioner secured to the base plate to selectively flex at least a portion of the base plate.

8. The data storage device of claim 7 wherein at least one of the piezoelectric motors is secured to the base plate under compression.

9. The data storage device of claim 7 wherein each of the piezoelectric motors is secured to the base plate under compression.

10. The data storage device of claim 7 wherein the base plate includes a plate mount that secures the base plate to the actuator arm, and wherein at least one of the piezoelectric motors is secured to the base plate substantially between the plate mount and the data transfer member.

11. The data storage device of claim 10 wherein the piezoelectric motors are positioned substantially parallel to each other.

12. The data storage device of claim 7 wherein at least one of the piezoelectric motors includes a proximal end and a distal end, and wherein the proximal end and the distal end are the only portions of the at least one piezoelectric motor that contact the base plate.

13. The data storage device of claim 7 wherein the flex section is substantially U-shaped.

14. The data storage device of claim 7 wherein the flex section is substantially V-shaped.

15. The data storage device of claim 7 wherein the base plate includes a plate side, and wherein the flex section cantilevers away from the plate side.

16. The data storage device of claim 7 wherein the base plate includes a pair of plate sides and a pair of flex sections, and wherein each of the flex sections cantilevers away from a corresponding plate side.

17. The data storage device of claim 7 wherein the base plate is separately formed.

18. A data storage device, comprising:
an actuator arm;
a data transfer assembly including a load beam and a data transfer member coupled to the load beam;
a base plate that secures the data transfer assembly to the actuator arm, the base plate having a thickness that is about three times or more the thickness of the load beam; and
a first piezoelectric motor having a proximal end and a distal end, the ends being secured to the base plate so that the first piezoelectric motor is under compression, the first piezoelectric motor selectively moving a portion of the base plate relative to the actuator arm.

19. The data storage device of claim 18 further comprising a controller that selectively directs current to the first piezoelectric motor, the first piezoelectric motor being under compression while the controller is not directing current to the first piezoelectric motor.

20. The data storage device of claim 18 wherein the proximal end and the distal end of the first piezoelectric motor are the only portions of the first piezoelectric motor that contact the base plate.

21. The data storage device of claim 20 further comprising a second piezoelectric motor and a second positioner cavity, and wherein the second piezoelectric motor has a proximal end and a distal end, the ends of the second piezoelectric motor being secured to the base plate so that the second piezoelectric motor is under compression.

22. The data storage device of claim 21 wherein the base plate includes a plate mount that secures the base plate to the actuator arm, and wherein at least one of the piezoelectric motors is secured to the base plate substantially between the plate mount and the data transfer member.

23. The data storage device of claim 22 wherein the piezoelectric motors are substantially parallel to each other.

24. The data storage device of claim 21 wherein the base plate includes a pair of flex sections that allow the base plate to flex, and wherein the piezoelectric motors do not contact the flex sections.

25. The data storage device of claim 24 wherein at least one of the piezoelectric motors is positioned substantially between the flex sections.

26. The data storage device of claim 24 wherein at least one of the flex sections is positioned substantially between the piezoelectric motors.

27. The data storage device of claim 18 wherein the base plate includes a flex section that allows the base to flex, the flex section being substantially U-shaped.

28. The data storage device of claim 18 wherein the base plate includes a flex section that allows the base to flex, the flex section being substantially V-shaped.

29. The data storage device of claim 18 wherein the base plate includes (i) a plate side, and (ii) a flex section that allows the base plate to flex, the flex section cantilevering away from the plate side.

30. The data storage device of claim 18 wherein the base plate includes (i) a pair of plate sides, and (ii) a pair of flex sections that allow the base to flex, each of the flex sections cantilevering away from a corresponding plate side.

31. The data storage device of claim 18 wherein the base plate is separately formed.

32. A data storage device, comprising:
an actuator arm;
a data transfer assembly including a load beam and a data transfer member coupled to the load beam;
a base plate supporting the data transfer assembly and having a thickness that is about three times or more the thickness of the load beam, the base plate including a plate mount that secures the base plate to the actuator arm; and
a pair of piezoelectric motors that are each secured to the base plate between the plate mount and the data transfer member, the piezoelectric motors being substantially parallel to each other, the piezoelectric motors selectively moving a portion of the base plate relative to the actuator arm.

33. The data storage device of claim 32 wherein each piezoelectric motor includes a proximal end and a distal end, wherein the ends of the piezoelectric motors are the only portions of the piezoelectric motors that contact the base plate.

34. The data storage device of claim 32 wherein the ends of at least one of the piezoelectric motors are secured to the base plate so that the at least one piezoelectric motor is under compression.

35. The data storage device of claim 32 wherein the base plate includes a pair of flex sections that allow the base plate to flex, and wherein at least one of the piezoelectric motors does not contact either of the flex sections.

36. The data storage device of claim 35 wherein at least one piezoelectric motor is positioned between the flex sections.

37. The data storage device of claim 36 wherein at least one of the flex sections is substantially U-shaped.

38. The data storage device of claim 36 wherein the base plate includes a plate side, and wherein at least one of the flex sections cantilevers away from the plate side.

39. The data storage device of claim 35 wherein at least one of the flex sections is positioned substantially between the piezoelectric motors.

40. The data storage device of claim 39 wherein at least one of the flex sections is substantially V-shaped.

41. The data storage device of claim 32 wherein the base plate is separately formed.

42. A data storage device comprising:
an actuator arm;
a data transfer assembly including a load beam and a data transfer member coupled to the load beam;
a base plate that secures the data transfer assembly to the actuator arm, the base plate including a pair of flex sections and a positioner cavity that extends through the base plate; and
a fine positioner including a pair of piezoelectric motors positioned so that the pair of flex sections are between the pair of piezoelectric motors, the fine positioner being secured to the base plate so that the fine positioner is positioned over at least a portion of the positioner cavity, the fine positioner selectively flexing at least a portion of the base plate.

43. The data storage device of claim 42 wherein at least one of the piezoelectric motors is secured to the base plate under compression.

44. The data storage device of claim 42 wherein each of the piezoelectric motors is secured to the base plate under compression.

45. The data storage device of claim 42 wherein the base plate is separately formed.

46. A method comprising:
  securing a data transfer assembly to an actuator arm via a base plate having a pair of spaced apart flex sections;
  securing a fine positioner including a pair of piezoelectric motors to the base plate, the pair of flex sections being positioned between the piezoelectric motors; and
  flexing the flex section with the fine positioner to cause at least a portion of the base plate to move relative to the actuator arm.

47. The method of claim 46 wherein the step of securing the data transfer assembly includes providing the base plate having a plate side, and cantilevering the flex section away from the plate side.

48. The method of claim 46 wherein the step of securing the fine positioner includes securing the fine positioner to the base plate so that the fine positioner is under compression.

49. The method of claim 46 wherein the step of securing the data transfer assembly includes using a plate mount of the base plate to secure the data transfer assembly to the actuator arm, and wherein the step of securing the fine positioner includes positioning the fine positioner to the base plate substantially between the plate mount and the data transducer.

50. A data storage device, comprising:
  an actuator arm;
  a data transfer member;
  a load beam that is coupled to and supports the data transfer member, the load beam having a thickness;
  a base plate that secures the load beam to the actuator arm, the base plate having a thickness that is at least approximately three times the thickness of the load beam, the base plate including a flex section that allows the base plate to flex; and
  a fine positioner that is secured to the base plate to selectively flex at least a portion of the base plate.

51. A method comprising:
  securing a data transfer assembly to an actuator arm via a load beam coupling a data transfer member to a base plate, the base plate having a flex section and a thickness of about three times or more of a thickness of the load beam;
  securing a fine positioner to the base plate; and
  flexing the flex section with the fine positioner to cause at least a portion of the base plate to move relative to the actuator arm.

52. The method of claim 51 wherein the step of securing the fine positioner includes using a piezoelectric motor as the fine positioner.

53. The method of claim 51 wherein the step of securing the data transfer assembly includes the base plate being characterized by a pair of spaced apart flex sections, and wherein the step of flexing the flex section is characterized by moving the fine positioner to flex each of the flex sections to cause at least a portion of the base plate to move relative to the actuator arm.

54. The method of claim 53 wherein the step of securing the fine positioner includes using a pair of spaced apart piezoelectric motors as the fine positioner and positioning the piezoelectric motors substantially between the flex sections.

55. The method of claim 54 wherein the step of securing the transducer assembly includes the base plate being characterized as having a plate side, and cantilevering the flex section away from the plate side.

56. The method of claim 53 wherein the step of securing the fine positioner includes using a pair of piezoelectric motors as the fine positioner and positioning the flex sections substantially between the piezoelectric motors.

57. The method of claim 51 wherein the step of securing the fine positioner includes securing the fine positioner to the base plate so that the fine positioner is under compression.

58. The method of claim 51 wherein the step of securing the data transfer assembly includes using a plate mount of the base plate to secure the data transfer assembly to the actuator arm, and wherein the step of securing the fine positioner includes positioning the fine positioner to the base plate substantially between the plate mount and the data transfer member.

59. The method of claim 51 wherein the base plate is separately formed.

* * * * *